No. 635,423. Patented Oct. 24, 1899.
S. H. CHASE.
FRUIT DRYING TRAY.
(Application filed Apr. 27, 1899.)
(No Model.)
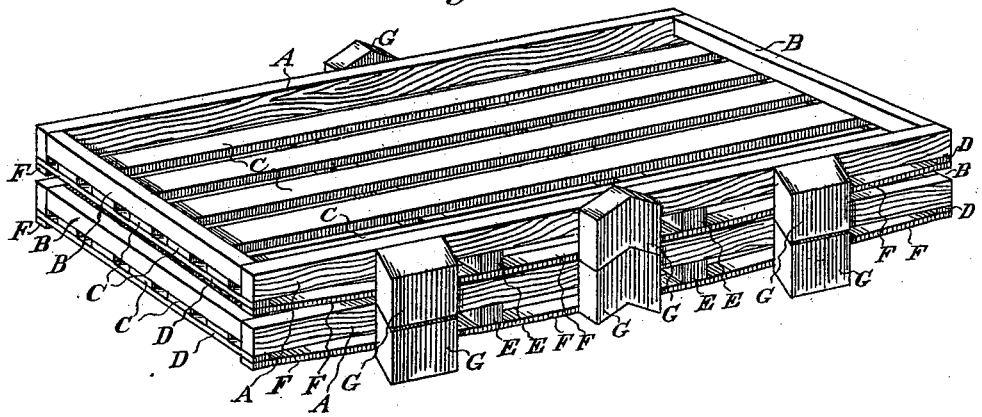
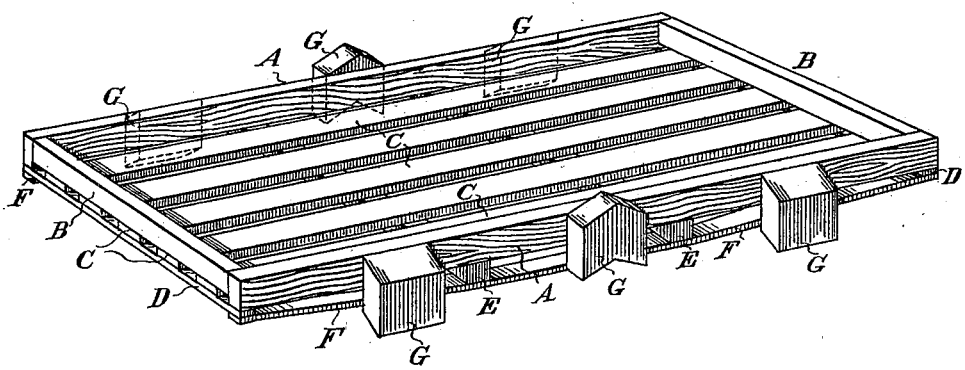
Witnesses,
Inventor,
Stephen H. Chase
By Dewey Strong & Co.
Attys.
THE NORRIS PETERS CO., PHOTO-LITHO., WASHINGTON, D. C.

# UNITED STATES PATENT OFFICE.

STEPHEN H. CHASE, OF SAN JOSÉ, CALIFORNIA.

FRUIT-DRYING TRAY.

SPECIFICATION forming part of Letters Patent No. 635,423, dated October 24, 1899.

Application filed April 27, 1899. Serial No. 714,628. (No model.)

*To all whom it may concern:*

Be it known that I, STEPHEN H. CHASE, a citizen of the United States, residing at San José, county of Santa Clara, State of California, have invented an Improvement in Fruit-Drying Trays; and I hereby declare the following to be a full, clear, and exact description of the same.

My invention relates to improvements in trays which are especially designed for drying fruit by exposure to the sun and atmosphere.

It consists, essentially, in the novel feature of a tray having a ventilating open-slat bottom and ventilating-openings upon the sides.

It also comprises details of construction which will be more fully explained by reference to the accompanying drawings, in which—

Figure 1 is a view of a single tray. Fig. 2 shows the trays stacked up.

In the construction of fruit-trays for drying purposes it has been customary to make these trays with close sides and a close bottom, or in some cases the bottoms have been made by the use of wire-screen material; but for the purposes of drying by the sun and atmosphere where the trays are laid upon the ground the bottoms have been usually closed to keep the fruit away from the ground. It is customary to expose the fruit to the sun and air for a considerable period, and after it is partly dried the trays are stacked up one on top of the other to allow the fruit to undergo what is termed a "sweating" process before the completion of the drying, as this improves the quality of the fruit. When such trays are made with close sides and close bottoms, there is no ventilation, and the process is incomplete and inferior. In my invention I have so constructed the trays as, first, to keep the fruit raised out of actual contact with the ground when the trays are spread thereon, and, second, to provide a space beneath for the free circulation of air and also to provide for such free circulation when the trays are stacked up in piles.

The trays may be made of any suitable or convenient size. I have found that a very convenient size is about eight feet in length by three feet in width, the sides A being made of material about one and one-half inches by five-eighths of an inch and the ends B about one and one-fourth by five-eighths of an inch. Longitudinal strips C are nailed lengthwise from end to end, having spaces between them sufficient for free circulation of air without being so wide as to allow the fruit to be pressed into the channels, especially in the case of very soft ripe fruits. The thickness of these longitudinal strips is about one-fourth of an inch, and being nailed to the ends, which are one and one-fourth inches deep, this brings the bottom of these strips on a level with the bottom of the side strips, which are one and one-half inches deep. Across the ends of these strips and below the end pieces B of the tray are nailed thin strips D, and intermediate between these strips are nailed transverse pieces E, which are of considerably-greater thickness.

F are thin strips of material which are nailed to the ends of the cross-strips beneath the side bars A, and the thickness of the cross-bars E is such as to leave a considerable space between the strips F and the strips A. The ends of the strips F are brought up against the thin transverse cross-strips D and are also nailed thereto, thus giving these strips a curvature upward between the last of the strips E and the strips D. This provides a space beneath the bottom slats C of the tray, so that when the trays are set upon the ground there will be a free circulation beneath and through them, and the fruit and tray-bottom are kept out of actual contact with the ground. In this manner the drying proceeds with much greater rapidity and is better equalized upon both sides.

By reason of the less depth of the sides there will be no shadows upon the fruit which is close to these sides when the sun is at any height.

In order to pile these trays properly, I have shown side pieces G nailed upon the side bars A and to the cross-strips, and these side pieces have their ends beveled, as shown. These bevels may be made in either direction, and as they are at an equal distance from the ends of all the trays when the trays are piled up these beveled ends interlock, and thus hold the trays in position and prevent their slipping to one side or the other. The longitudinal strips F upon each side rest upon the top of the strips A below, and the spaces between the strips A and F are sufficient to form open channels along the sides through which the free circulation of air takes place.

In some cases it may be found desirable to make the bottoms of the trays close, in which case I am enabled to use very thin material, like veneer, on account of the support which is given to the bottom of the boards beneath.

Having thus described my invention, what I claim as new, and desire to secure by Letters Patent, is—

1. A fruit-tray consisting of sides, ends of less depth than the sides nailed thereto, bottom slats nailed to the ends having open spaces between said slats having a thickness equal to the difference in depth between the side and end pieces of the tray whereby the bottom of the slats are flush with the lower edges of the said strips, transverse bars nailed across the bottom and sides of the tray at intervals and strips of less thickness nailed across beneath the ends of the trays and side strips nailed to the bottom of the cross-bars in line beneath the side rails of the tray, said strips curving upwardly at each end and nailed to the transverse strips thereon.

2. A fruit-drying tray consisting of sides, ends and interspaced longitudinal bottom strips with cross-bars beneath, and side strips nailed thereto in line beneath the side rails of the box, and pieces having the upper and lower ends beveled and adapted to engage and interlock said pieces being nailed to the sides of the tray so as to stand in vertical line when the trays are piled one upon another.

In witness whereof I have hereunto set my hand.

STEPHEN H. CHASE.

Witnesses:
  S. H. NOURSE,
  JESSIE C. BRODIE.